Patented July 27, 1954

2,684,893

UNITED STATES PATENT OFFICE 2,684,893

GASOLINE ANTIOXIDANTS

Everett C. Hughes, Shaker Heights, and Samuel M. Darling, Lyndhurst, Ohio, assignors to The Standard Oil Company, Cleveland, Ohio, a corporation of Ohio No Drawing. Application October 1, 1951, Serial No. 249,229

11 Claims. (Cl. 44—52)

This invention relates to novel chemical compounds, more particularly to N-alkylideneoxyalkyl phenylene diamines, and to fuels derived from petroleum comprising such compounds.

With the advent of so-called antiknock gasoline, the problems of gasoline stability as to color, gum content and knock rating have become of great importance. Some cracked and straight run gasolines of high quality which are satisfactory for use at the time they are blended deteriorate in storage so that they become darker in color, higher in gum content and of lessened knock rating. Loss of antiknock rating seriously lessens the market value of the gasoline, while gum is likely to deposit in the induction system of the motor.

Induction system deposits may be the cause of serious operational difficulties, for the accumulation of deposits in the fuel-air induction passageway diminishes its size and therefore the maximum air flow which the passage is capable of delivering to the engine.

The effects of such deposits on engine performance are, therefore, manifested whenever the engine is operated at or near full throttle as a reduction in power output due directly to the reduction in air flow. In addition, if the engine is equipped with a gear-driven supercharger, deposits may form on the diffuser plate and impeller, overloading the impeller spacer and possibly resulting in mechanical failure of the supercharger.

Drastic chemical treatment will stabilize cracked gasoline, but it is costly because of the losses it entails, particularly in gasolines of high knock rating, and because it is accompanied by destruction or degrading of components having valuable antiknock properties. Chemical treatment is, therefore, undesirable and has in the past been minimized or avoided altogether.

Instead, the art has turned to the addition of antioxidants to the gasoline in an attempt to solve the problem. The most important of the many factors which influence the rate of deterioration is oxygen. Gasoline out of contact with air changes very slowly. Consequently, the theory has been advanced that gum formation is primarily due to the auto-oxidation of olefinic hydrocarbons which induces formation of chain-propagating free radicals. These in turn engage in polymerization and condensation reactions in the system. Since cracked gasolines normally contain from 10 to 60% olefins, the possibilities for polymerization are quite large and the amount of gum which ultimately may be formed quite high. The auto-oxidation of olefinic hydrocarbons, particularly conjugated diolefins, is usually accompanied by the formation of polymeric peroxides. These are thought to constitute a large portion of the "potential gum" in aged gasoline and are readily decomposed at the higher temperatures of the engine to form adherent deposits.

Gasoline antioxidants are generally believed to retard oxidation by reacting with the chain-propagating free radicals, generating free radicals which are incapable of initiating chain reactions but are instead converted into relatively stable compounds. Thus, formation of gum becomes impossible or, in any event, considerably retarded by a reduction in the number of chain-propagating free radicals.

A large number of compounds have been proposed for use as antioxidants for gasoline, particularly phenols, aminophenols and phenylene-diamines. A number of these compounds are available and in commercial use. However, it has been reported in the literature that available inhibitors, while they may be effective in reducing gum formation due to components in the gasoline, themselves give rise to induction system deposits. W. J. Sweeney, J. F. Kunc, Jr., and W. E. Morris, in a paper presented at the annual meeting of the Society of Automotive Engineers at Detroit, Michigan, January 7 to 11, 1946, point out that a relationship exists between the inhibitor content of a fuel and the quantity of deposit laid down in the fuel induction system. Furthermore, the type and condition of the inhibitor used definitely influence induction system deposition. These workers tested three different types of commercial inhibitors and concluded that oxidized and degraded inhibitors produce particularly serious induction system deposits.

In an article entitled "Cutting Aircraft Maintenance Cost" appearing in ASTM Bulletin No. 148 dated October, 1947, at page 79, it is pointed out that of the induction system deposits analyzed therein 40% was thought to be due to gum, inhibitor and the products of inhibitor oxidation.

It is obvious that the utility of an inhibitor which is effective in reducing oxidation of olefinic hydrocarbons in the gasoline may be quite outweighed if the inhibitor itself gives rise to significant induction system deposits.

Accordingly, it is an object of the present invention to provide an inhibitor for use in gasolines which inhibits the formation of insoluble gums and resins and the deposition of such materials in the induction system of internal combustion engines.

In accordance with this invention, these objects are achieved through use of N-alkylidene-oxyalkyl phenylene diamines. These compounds are incorporated in fuels derived from petroleum and are effective therein, not only to inhibit the formation of gum, but also to prevent formation of deposits in the induction system of internal combustion engines. Fuels comprising the compounds of the invention are, therefore, characterized by improved stability and a lower apparent gum content due to a reduction in the amount of gum deposited during use.

These compounds are to be distinguished from the N-substituted phenylene diamines heretofore known as gasoline anti-oxidants, from which they differ in the presence of one or more ether linkages in the N-substituted side chain. To this difference in structure is attributed the improved potency of the compounds of the invention as anti-oxidants and gum deposition inhibitors, compared to other N-substituted phenylene diamines. They are also to be distinguished from alkoxy aryl compounds containing amino or hydroxyl groups, such as anisole, phenetole and methoxy and ethoxy aniline, which possesses little or no anti-oxidant properties.

THE COMPOUNDS OF THE INVENTION

These compounds have the following general formula:

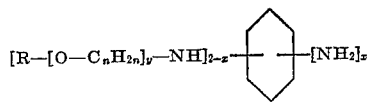

$$[R-[O-C_nH_{2n}]_y-NH]_{2-x}-\langle\text{ring}\rangle-[NH_2]_x$$

where R is an alkyl radical, $n$ is a small whole number from one to about three, $x$ is zero or one, $y$ is a small whole number from one to about five, and the nitrogen of the amine groups are directly attached to different carbon atoms of the benzene ring. The $C_nH_{2n}$ chain may be either straight or branched.

The ether structure is very important to the inhibitory activity of these compounds. Also, if a hydrogen atom is not attached to the nitrogen atom of the alkylidene oxyalkyl group or groups their activity is reduced. The para N-alkylidene-oxyalkyl and amine derivatives are the most effective anti-oxidants and therefore are preferred.

R may be any alkyl group having from one to about ten and preferably one to four carbon atoms arranged in a straight or branched chain, such as methyl, ethyl, n-propyl, isopropyl, n-butyl, isobutyl, sec-butyl, tert-butyl, pentyl, hexyl, heptyl, octyl, nonyl, isononyl, decyl and isodecyl.

The following are examples of mono N-alkylidene oxyalkyl ortho, meta and para phenylene diamines falling within the invention:

1. $C_2H_5-O-CH_2CH_2NH-\langle\text{C}_6\text{H}_4\rangle-NH_2$
2. $C_2H_5-O-CH_2CH_2-O-CH_2CH_2NH-\langle\text{C}_6\text{H}_4\rangle-NH_2$
3. $C_4H_9-O-CH_2CH_2NH-\langle\text{C}_6\text{H}_4\rangle-NH_2$
4. $C_2H_5-O-CH_2-O-CH_2NH-\langle\text{C}_6\text{H}_4\rangle-NH_2$
5. $C_3H_7-O-CH_2CH_2CH_2NH-\langle\text{C}_6\text{H}_4\rangle(-NH_2)$
6. $C_3H_7-O-CH_2CH_2-O-CH_2CH_2NH-\langle\text{C}_6\text{H}_4\rangle(-NH_2)$
7. $C_2H_5-O-CH_2CH_2-O-CH_2CH_2NH-\langle\text{C}_6\text{H}_4\rangle(-NH_2)$
8. $C_2H_5OCH_2CH_2NH-\langle\text{C}_6\text{H}_4\rangle(-NH_2)$
9. $C_3H_7-O-(CH_2)_3-O-CH_2CH_2NH-\langle\text{C}_6\text{H}_4\rangle-NH_2$
10. $C_2H_5-O-CH(CH_3)CH_2-O-CH(CH_3)CH_2NH-\langle\text{C}_6\text{H}_4\rangle-NH_2$
11. $C_2H_5-O-CH_2CH_2-O-CH_2CH_2-O-CH_2CH_2-O-CH_2CH_2-O-CH_2CH_2NH-\langle\text{C}_6\text{H}_4\rangle-NH_2$
12. $C_4H_9-O-CH(CH_3)CH_2-O-CH(CH_3)CH_2-O-CH(CH_3)CH_2-O-CH(CH_3)CH_2-O-CH(CH_3)CH_2NH-\langle\text{C}_6\text{H}_4\rangle-NH_2$
13. $CH_3CH_2-O-CH_2CH_2-NH-\langle\text{C}_6\text{H}_4\rangle(-NH_2)$
14. $C_4H_9-O-CH_2CH_2-O-CH_2CH_2-NH-\langle\text{C}_6\text{H}_4\rangle-NH_2$
15. $C_2H_5-O-CH(C_5H_{11})CH_2-O-CH(C_5H_{11})CH_2-O-CH(CH_3)CH_2-NH-\langle\text{C}_6\text{H}_4\rangle-NH_2$
16. $C_2H_5-O-(CH_2)_3-O-(CH_2)_3-O-(CH_2)_3-NH-\langle\text{C}_6\text{H}_4\rangle-NH_2$
17. $C_3H_7-O-CH_2-O-CH_2-O-CH_2CH_2-NH-\langle\text{C}_6\text{H}_4\rangle(-NH_2)$ The following are examples of o-, m- and p-di(N-substituted) phenylene diamine derivatives:

18. $C_2H_5-O-CH_2CH_2NH-\langle\text{C}_6\text{H}_4\rangle-NHCH_2CH_2-O-C_2H_5$ (para)

19. $C_2H_5-O-CH_2CH_2-O-CH_2CH_2NH-\langle\text{C}_6\text{H}_4\rangle-NHCH_2CH_2-O-C_2H_5$

20.

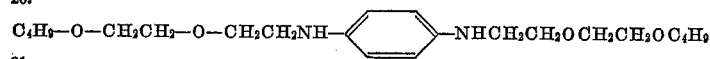

21.

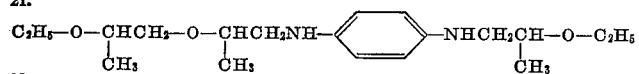

22.

23.

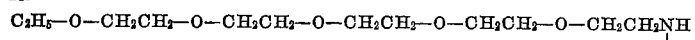

24.

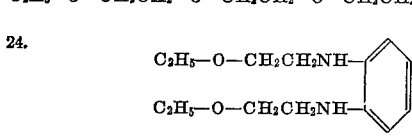

25.

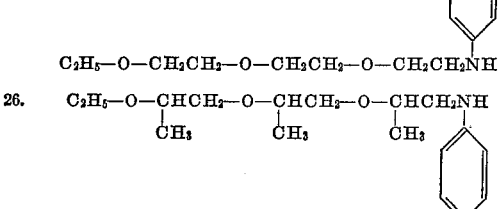

26.

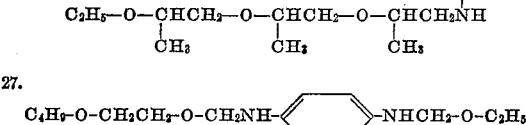

27.

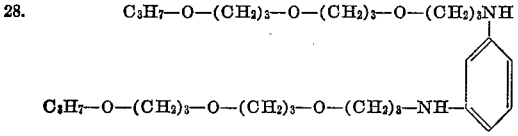

28.

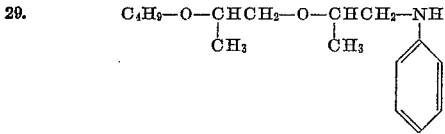

29.

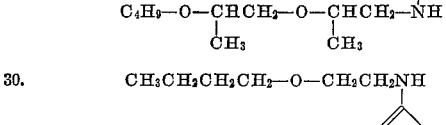

30.

$CH_3CH_2CH_2CH_2-O-CH_2CH_2NH$

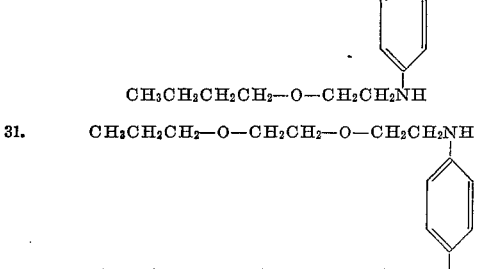

$CH_3CH_2CH_2CH_2-O-CH_2CH_2NH$

31.

$CH_3CH_2CH_2-O-CH_2CH_2-O-CH_2CH_2NH$ $CH_3CH_2CH_2-O-CH_2CH_2-O-CH_2CH_2NH$

These compounds may be prepared in accordance with conventional procedures, which do not form a part of the present invention. To illustrate their preparation by one procedure, the following scheme is presented:

(a) $RONa + ClCHR'COOH \longrightarrow ROCHR'COOH$ (b) 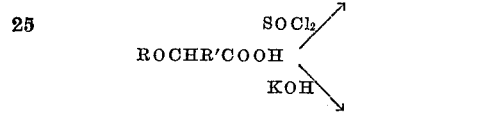

(c) $ROCHR'COCl + ROCHR'COOK \longrightarrow$ 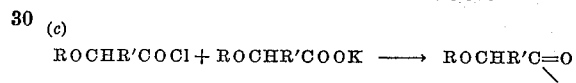

(d) 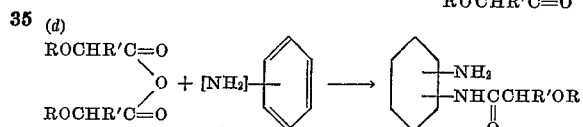

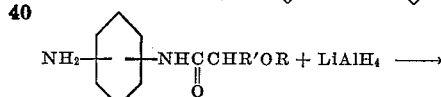

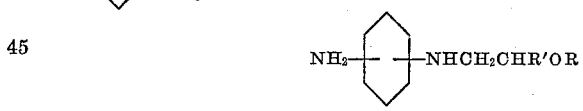

R and R' are alkyl groups, or alternatively R is an alkyl group and R' is hydrogen.

Using double the quantity of anhydride in step (d), the di (N-substituted) derivative is obtained, which then can be converted to the desired ether with LiAlH₄ as shown.

Example I.—*Preparation of p-N-ethoxyethyl-phenylene diamine*

Ethoxy acetic acid (26 g.), prepared from sodium ethoxide and chloroacetic acid, is mixed with 30 g. of thionyl chloride and the solution heated at 40 to 60° C. for at least two hours and allowed to stand at room temperature until evolution of $SO_2$ and HCl ceases. The product is distilled twice through an efficient Vigereaux column. A 56 to 84% yield of ethoxyacetyl chloride is obtained.

To 12.25 g. of freshly distilled ethoxyacetyl chloride is added 14.2 g. of potassium ethoxyacetate (prepared by titrating ethoxyacetic acid with 2 N KOH solution to a phenolphthalein end point evaporating the solution to dryness and powdering the resulting solid). The addition is gradual, with cooling, to control the rapid reaction which follows. After all the solid has been added, the reaction mixture is heated at 100° C.

for at least three hours and the resulting mixture distilled in vacuo. About 18 g. (63 to 75% yield) of colorless ethoxyacetic anhydride (boiling point 125–138° C. at 16 mm.) is recovered.

Freshly purified p-phenylene diamine (10 g.) is dispersed in 100 cc. of distilled water and the slurry cooled to 10° C. Nineteen g. of ethoxyacetic anhydride is added quickly and the solution stirred. The phenylene diamine dissolves. The mixture is neutralized with a base and the anilide is separated. The solid is filtered with suction and dried in a desiccator over sulfuric acid in a nitrogen atmosphere. Solid p-amino N-ethoxyacetanilide is obtained.

To a flask containing 150 cc. of freshly fractionated tetrahydrofuran (dried over sodium hydroxide) and fitted with a water condenser and a hopper is added 22.0 g. of anhydrous aluminum chloride in small portions. This solution is then transferred to a dropping funnel.

One hundred cc. of freshly fractionated dried tetrahydrofuran is placed in a one liter, three necked flask fitted with a mercury-seal stirrer and a Dry Ice-acetone cold finger condenser. One gram of commercial lithium aluminum hydride is added and the slurry refluxed for two hours until the lithium aluminum hydride has dissolved. It is then cooled and 5.8 grams of lithium hydride added. The dropping funnel containing the aluminum chloride solution is then fitted to the flask and the solution added slowly at a rate to just maintain refluxing. The gray-green slurry which results is allowed to stand overnight with a drying tube containing drierite and ascarite attached to the condenser outlet.

The slurry is then cooled to 20–25° C. and 12 grams of p-amino-N-ethoxyacetanilide added gradually with stirring over 30 minutes while the temperature is maintained between 20 and 25° C. The mixture is then stirred 20 minutes longer at the same temperature, after which the temperature is raised to between 63 and 66° C. for 10 to 15 minutes, cooled to room temperature and allowed to stand for 2 to 3 hours.

Water is added dropwise with care to decompose any excess lithium aluminum hydride or lithium hydride. This decomposition is violent and considerable gas and heat are liberated. When no further reaction is evident, 400 cc. of a 20% potassium sodium tartrate solution is added. The solid is separated from the liquid phase by filtration and the tetrahydrofuran removed by steam distillation. Subsequent operations must be carried out under nitrogen since the product, p-N-ethoxyethyl-phenylene diamine, is very sensitive to oxidation.

The residue is extracted with six 100 cc. portions of chloroform to remove the p-N-ethoxyethyl-p-phenylene diamine. The chloroform is removed by distillation under vacuum, and the reaction product, p-amino-N-ethoxy acetanilide, is recovered from the residue.

Following the above general procedure, any of the inhibitors in accordance with the invention may be prepared, using appropriate intermediates, as will be evident to those skilled in the art.

THE FUELS OF THE INVENTION

In practice one or a mixture of two or more compounds in accordance with the invention are blended into the fuel at the refinery. Since the compounds are liquids and quite soluble in hydrocarbon fuels derived from petroleum, incorporation is easily accomplished by simply stirring the compounds, usually in an amount between 0.001% and 0.10% and preferably 0.001 to 0.01% by weight, into the fuel blend. In general, depending upon the grade of gasoline, it is desirable to employ proportions within the following ranges:

Regular grade gasoline blends

| | |
|---|---|
| Mixed catalytically and thermally cracked petroleum distillate of gasoline grade | 60 to 75% by volume. |
| Straight run gasoline | 25 to 40% by volume. |
| Tetraethyl lead | 0.5 to 3.0 cc. per gallon. |
| Inhibitor | 0.001 to 0.01% by weight. |

Butane in sufficient amount to obtain a Reid vapor pressure of 8 to 15 pounds per square inch, depending on the season of the year.

Premium grade gasoline blends

| | |
|---|---|
| Mixed catalytically and thermally cracked petroleum distillate | 75 to 90% by volume. |
| Straight run gasoline | 5 to 20% by volume. |
| Catalytic polymer gasoline | 3 to 10% by volume. |
| Tetraethyl lead | 0.5 to 3.0 cc. per gallon. |
| Inhibitor | 0.001 to 0.01% by weight. |

Butane in sufficient amount to obtain a Reid vapor pressure of 8 to 15 pounds per square inch, depending on the season of the year.

Fuels in accordance with the invention are characterized by improved stability to oxygen, remaining practically unchanged even after four weeks' storage in air at fairly high summer temperatures. Because of their improved stability, gum formation from "potential" gum is inhibited. In addition, deposition of the "preformed" gum contained in the fuel is minimized. The latter effect is enhanced by those compounds of the invention having longer polyether chains, and is greatest in those compounds having three or more ether linkages affixed to the amino nitrogen, such as, for example, compounds Nos. 11, 12, 15, 16, 20, 23, 25, 28 and 31.

The following examples illustrate motor fuels designed for use in internal combustion engines and embodying oxidation and gum deposition inhibitors of the invention.

Example 2.—Thermally cracked gasoline fuel having an F-1 octane rating of 90.5

Four gasoline blends are prepared composed of thermally cracked petroleum distillate and containing 0.005% by weight inhibitor. In three blends the inhibitors were compounds of the prior art, N,N'-di-secbutyl-p-phenylene diamine, N-n-butyl-p-amino phenol, 2,6 di-tertbutyl-4-methylphenol, respectively, and in the fourth, the inhibitor was p-N-ethoxyethyl phenylene diamine, a compound of the invention.

As a measure of the effectiveness of these compounds as oxidation inhibitors, four gallons of each of the fuels are stored in 5-gallon tightly closed cans and samples taken at intervals of one and four weeks to determine the rate of preformed gum formation. Storage temperatures are in the range of 30 to 90° F. The induction period in each case is determined by the ASTM test, Designation D525-46. Tests are made to determine the amount of preformed gum by deposition during burning in accordance with the ASTM test, Designation D381-46.

The inhibitor of the invention is more effective in preventing oxidation than the other inhibitors.

As a measure of the effectiveness of the compounds both as antioxidants and as gum deposition inhibitors the induction manifold deposits are measured by the glass manifold test. This test is conducted using the CFR single-cylinder engine. A glass tube 43 cm. in length and 2 cm. in diameter is inserted in a horizontal position between the standard air intake-carburetor assembly and the cylinder. A length of Nichrome wire of 10 ohms resistance is coiled, and eight turns of the coil are wound around the glass tube. The first turn is 12 cm. from the carburetor and the eight turns extend over a length of 8 cm. of the tubing. A thermocouple is taped to the tube ½ inch beyond the last coil. This coil provides a hot-spot in the induction system. The engine is then operated under the following conditions:

| | |
|---|---|
| Load | None |
| Speed, R. P. M | 600 |
| Cooling temp. °F | 210° F. |
| Oil temp. °F | 150° F. |
| Air temp., intake, °F | 95°±5° F. |
| Air/fuel ratio (weight) | 12.5±0.5 |
| Time of test, hrs | 10 |
| Fuel consumption, gal./hr | 0.19 |

The Nichrome "hot spot" is heated and controlled by a Variac so that the thermocouple ½ inch beyond the wire indicates a temperature of 170°±5° F. The amount of deposit in the glass tube is measured after each test. A fresh tube is used for each test.

Fuels which have been in storage four weeks are subjected to the glass manifold test. A fuel containing the inhibitor of the invention is more stable to oxidation and has a much lower tendency to form induction system deposits than fuels containing the other inhibitors tested.

No deposits form in the power section of the CFR engine.

*Example 3.—Regular grade gasoline fuel having an F-1 octane rating of 84.0*

Four fuels are prepared containing 68.7% by volume mixed catalytically and thermally cracked gasoline, 31.3% by volume straight run gasoline and 0.005% by weight inhibitor. The inhibitors in three blends are N,N'-di-sec-butyl-p-phenylene diamine, N-n-butyl-p-amino phenol, 2,6 di-tertbutyl-4-methyl-phenol, all compounds of the prior art, and in the fourth blend is p-N-ethoxyethyl-p-phenylene diamine, a compound of the invention.

As a test of the effectiveness of the inhibitors as antioxidants, the induction period of these fuels is determined in accordance with ASTM test, Designation D525-46 and the amount of preformed gum present before and after storage in four gallon quantities in 5-gallon tightly closed metal cans is determined in accordance with ASTM test, Designation D381-46. Storage temperatures are between 80 and 90° F.

The effectiveness of the inhibitors in preventing induction manifold deposits is measured, using 4 and 6 week old samples, by the glass manifold test described in Example 2.

A fuel containing the inhibitor in accordance with the invention is more stable to oxidation and has less tendency to form induction system deposits than those with the other inhibitors tested.

No deposits form in the power section of the CFR engine.

The gum present in gasoline may be thought of as consisting of two types, "preformed" or actual gum, composed of nonvolatile organic material, and "potential" gum, composed of oxidizable unsaturated hydrocarbons initially volatile but which, during the execution of a test or in storage, change in character and become nonvolatile, i. e., preformed gum. It is generally agreed that only the preformed gum will deposit in the induction system of a motor. The potential gum is of little significance with reference to the motor use of the gasoline at the time of the test, although its rate of conversion to preformed gum indicates to some degree the stability of the gasoline in storage. Thus, the term "gum" is used throughout this specification and claims to refer to preformed gum. It will be evident from the above discussion that, in terms of this definition, the inhibitors of the invention tend to prevent conversion of potential gum into preformed gum, and also to prevent deposition of preformed gum in the induction system and power section of the engine. In each of these functions they are more effective than the prior amino phenol and phenylene diamine derivatives suggested for use in gasoline fuels.

We claim:

1. Compounds having the general formula:

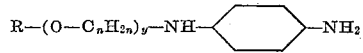

where R is an alkyl radical having from one to about ten carbon atoms, $n$ is a small whole number from one to about three, and $y$ is a small whole number from one to about five.

2. N-ethyleneoxyethyl p-phenylene diamine.

3. A fuel for internal combustion engines comprising a gum forming gasoline as the major component and a small amount sufficient to inhibit gum formation of a compound having the general formula:

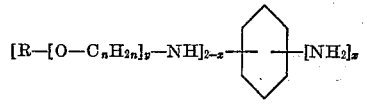

where R is an alkyl radical having from one to about ten carbon atoms, $n$ is a small whole number from one to about three, $x$ is a small whole number from zero to one, $y$ is a small whole number from one to about five, and the nitrogen atoms of the amino groups are directly attached to different carbon atoms of the benzene ring.

4. A fuel for internal combustion engines comprising a gum forming gasoline as the major component and a small amount sufficient to inhibit gum formation of a compound having the general formula:

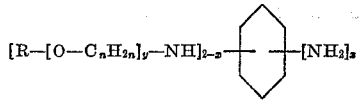

where R is an alkyl radical having from one to about ten carbon atoms, $n$ is a small whole number from one to about three, $x$ is a small whole number from zero to one, $y$ is a small whole number from one to about five, and the nitrogen atoms of the amino group are directly attached in the para position to carbon atoms of the benzene ring.

5. A fuel for internal combustion engines comprising a gumforming gasoline as the major component and a small amount sufficient to inhibit gum formation of a compound in accordance with claim 2.

6. A fuel comprising cracked petroleum distillate as the major component, tetraethyl lead, butane and a small amount sufficient to inhibit gum formation of a compound having the general formula:

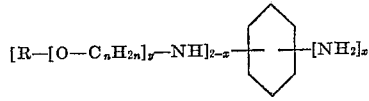

where R is an alkyl radical having from one to about ten carbon atoms, n is a small whole number from one to about three, x is a small whole number from zero to one, y is a small whole number from one about five, and the nitrogen atoms of the amino groups are directly attached to different carbon atoms of the benzene ring.

7. A fuel comprising cracked petroleum distillate as the major component, tetraethyl lead, butane and a small amount sufficient to inhibit gum formation of a compound having the general formula:

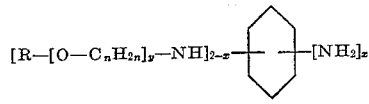

where R is an alkyl radical having from one to about ten carbon atoms, n is a small whole number from one to about three, x is a small whole number from zero to one, y is a small whole number from one to about five, and the nitrogen atoms of the amino groups are directly attached in the para position to carbon atoms of the benzene ring.

8. A fuel comprising approximately 69% cracked petroleum distillate, approximately 31% straight run gasoline, approximately 1.3 cc. per gallon tetraethyl lead, butane in an amount to obtain a Reid vapor pressure of 8 to 15 pounds per square inch and between about 0.001 and about 0.10% by weight of a compound having the general formula:

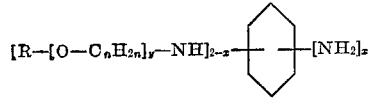

where R is an alkyl radical having from one to about ten carbon atoms, n is a small whole number from one to about three, x is a small whole number from zero to one, y is a small whole number from one to about five, and the nitrogen atoms of the amino groups are directly attached to different carbon atoms of the benzene ring.

9. A fuel comprising cracked petroleum distillate, straight run gasoline and catalytic polymer gasoline as the major components, tetraethyl lead, butane and a small amount sufficient to inhibit gum formation of a compound having the general formula:

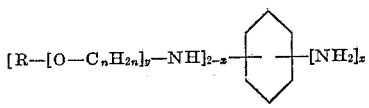

where R is an alkyl radical having from one to about ten carbon atoms, n is a small whole number from one to about three, x is a small whole number from zero to one, y is a small whole number from one to about five, and the nitrogen atoms of the amino groups are directly attached to different carbon atoms of the benzene ring.

10. A fuel comprising cracked petroleum distillate, straight run gasoline and catalytic polymer gasoline as the major components, tetraethyl lead, butane and a small amount sufficient to inhibit gum formation of a compound having the general formula:

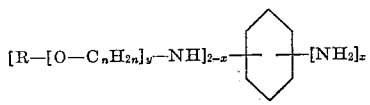

where R is an alkyl radical having from one to about ten carbon atoms, n is a small whole number from one to about three, x is a small whole number from zero to one, y is a small whole number from one to about five, and the nitrogen atoms of the amino groups are directly attached in the para position to carbon atoms of the benzene ring.

11. A fuel comprising approximately 84% cracked petroleum distillate, approximately 10% straight run gasoline, approximately 5% catalytic polymer gasoline, approximately 3 cc. per gallon tetraethyl lead, butane in an amount to obtain a Reid vapor pressure of 8 to 15 pounds per square inch and between about 0.001 and about 0.10% by weight of a compound having the general formula:

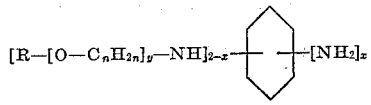

where R is an alkyl radical having from one to about ten carbon atoms, n is a small whole number from one to about three, x is a small whole number from zero to one, y is a small whole number from one to about five, and the nitrogen atoms of the amino groups are directly attached to different carbon atoms of the benzene ring.

References Cited in the file of this patent

UNITED STATES PATENTS

| Number | Name | Date |
|---|---|---|
| 2,045,323 | Felix et al. | June 23, 1936 |